United States Patent
Raitola et al.

(10) Patent No.: US 6,317,418 B1
(45) Date of Patent: Nov. 13, 2001

(54) METHOD FOR TRANSMITTING PACKET SWITCHED DATA IN A MOBILE COMMUNICATIONS SYSTEM

(75) Inventors: Mika Raitola, Masala; Hannu Häkkinen, Espoo; Mikko J. Rinne, Helsinki; Kalle Ahmavaara, Vantaa; Oscar Salonaho, Helsinki, all of (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/067,100

(22) Filed: Apr. 27, 1998

(30) Foreign Application Priority Data

Apr. 28, 1997 (FI) .......................................................... 971810

(51) Int. Cl.[7] ............................. G08C 25/02; H04L 1/20; H04L 1/18
(52) U.S. Cl. ...................... 370/278; 370/277; 370/282; 370/913; 714/748; 714/799
(58) Field of Search ................................... 370/349, 395, 370/280, 332, 333, 337, 347, 389, 474, 336, 338, 912, 913, 276, 277, 278, 282, 310, 328; 714/748, 749, 752, 758, 744, 825, 701, 746, 751, 761, 762, 799

(56) References Cited

U.S. PATENT DOCUMENTS

| 5,168,502 | 12/1992 | Millet ........................................ 371/32 |
| 5,257,257 | 10/1993 | Chen et al. ............................. 370/18 |
| 5,487,068 | 1/1996 | Smolinske et al. ................. 370/94.1 |
| 5,563,895 | 10/1996 | Malkamaki et al. .................... 371/32 |
| 5,640,395 | 6/1997 | Hamalainen et al. ................ 370/322 |
| 5,677,918 * | 10/1997 | Tran et al. .............................. 371/32 |
| 5,717,689 * | 2/1998 | Ayanoglu ............................. 370/349 |
| 5,729,534 | 3/1998 | Jokinen et al. ........................ 370/280 |
| 5,729,541 * | 3/1998 | Hamalainen et al. ................ 370/337 |
| 5,802,051 * | 9/1998 | Petersen et al. ...................... 370/395 |
| 5,954,839 * | 9/1999 | Park et al. ............................. 714/825 |
| 5,968,197 * | 10/1999 | Doiron .................................. 714/748 |
| 5,983,382 * | 11/1999 | Pauls ..................................... 714/744 |
| 6,021,124 * | 2/2000 | Haartsen ............................... 370/336 |

FOREIGN PATENT DOCUMENTS

| 0 387 957 A1 | 9/1990 | (EP) . |
| 0 595 637 A1 | 5/1994 | (EP) . |
| WO 93/06671 | 4/1993 | (WO) . |

OTHER PUBLICATIONS

Dimitri Bertsekas and Robert Gallager, Data Networks, 1987, Book, pp. 58–73.*
PCT International Search Report.
Matsuki et al., "An Error Control Scheme for High–quality, High–speed PHS Data Communications", NTT Review, vol. 9, No. 3, May 1997.

* cited by examiner

Primary Examiner—Hassan Kizou
Assistant Examiner—Joe Logsdon
(74) Attorney, Agent, or Firm—Perman & Green, LLP

(57) ABSTRACT

The invention relates to a method for transmitting packet switched data in a mobile communications system using an ARQ protocol. In the method the receiver requests, if necessary, retrasnmissions of the originally sent transmission unit, until the quality of the combined transmission unit formed of the originally sent transmission unit and its retransmitted copies corresponds to the predetermined quality level. The signal is not detected until after this. If the packet is interleaved and encoded and it is found out that the packet is not faultless, retransmissions of the transmission units of the packet that are of the poorer quality are requested. The invention also relates to a mobile communications system implementing the method of the invention.

19 Claims, 5 Drawing Sheets

METHOD FOR TRANSMITTING PACKET SWITCHED DATA IN A MOBILE COMMUNICATIONS SYSTEM

FIELD OF THE INVENTION

The invention relates to a method for transmitting packet switched data in a mobile communications system between a transmitter-receiver pair using an ARQ protocol, which mobile communications system comprises a network part and at least one subscriber terminal and a bidirectional radio connection between the network part and the subscriber terminal, and the transmitter-receiver pair is formed by the network part and the subscriber terminal, and the data to be transmitted on the bidirectional radio connection is inserted in transmission units.

BACKGROUND OF THE INVENTION

Circuit switching is a method in which a connection is established between users by providing a predetermined amount of transmission capacity for the connection. Transmission capacity is exclusively in use of the connection in question for the total duration of the connection. Thus prior art mobile communications systems, such as the GSM-based GSM 900/DCS, 1800/PCS and 1900 systems and the U.S. radio system utilizing the CDMA technology are circuit switched systems. Packet switching is a method in which a connection is established between users by transmitting data in packets which in addition to the actual data contain address information and control information. Several connections may use the same transmission connection simultaneously. Use of packet switched radio systems especially for data transmission has been studied during the past years since the packet switching method suits well e.g. for the data transmission which is needed for interactive computer programs and in which the data to be transmitted is generated in bursts. Thus it is not necessary to reserve a data transmission connection for the total duration of transmission, but only for transmitting packets. This allows to save on costs and capacity considerably both when the network is built and used.

Researches on the packet radio networks began at the University of Hawaii in 1968 in connection with the ALOHA project in which remote equipment were connected to a central computer using a radio connection. In the further development of the GSM system, known as GPRS (General Packet Radio Service), special attention has focused on the packet radio networks. Solutions enabling packet transmission are planned in particular for mobile communications systems of the third generation, such as the UMTS (Universal Mobile Telephone System). The GPRS uses either the basic form or more advanced forms of the ARQ protocol which will be described next.

The ARQ protocol (Automatic Repeat Request) refers to a procedure in which retransmission of the information to be transmitted allows to improve the reliability of the data to be transmitted by improving its bit error rate. According to the protocol, the receiver sends a request for retransmitting the transmitted data to the transmitter if the receiver considers the received data unreliable. Unreliability of data can be found out e.g. by checking the checksum of the received packet. Until now the protocol has been used mainly in fixed networks. A major problem associated with radio networks is that the channels used for transmission on radio connections tend to fade. Fading (Rayleigh Fading) means that signal components that have propagated along multiple paths enter a receiver at reverse phases, and thus they partially cancel each other. In this case the power and the quality of the received signal decrease significantly. In addition to the normal background noise, the reception is hindered by interference caused to the radio connection by radio connections that are on the same channel and on the adjacent channels. The influence of interference and fading may be occasionally so harmful that the radio channel fades, i.e. its quality becomes so poor that the information transmitted on the channel cannot be recognized. On the other hand, the fading channel occasionally also has a very good quality.

A more advanced form of the ARQ basic protocol is the hybrid-ARQ which utilizes the combination of the ARQ and the FEC (Forward Error Correction). FEC means that the information to be transmitted is encoded using error correction coding. According to the improved type II hybrid-ARQ protocol, developed from the hybrid-ARQ, the data to be transmitted is coded so that the data is divided into several data blocks, and the data block to be transmitted first includes the data to be transmitted in uncoded form or in slightly encoded form. If the receiver considers the first data block erroneous, the receiver requests transmission of the next data block. In the subsequent data blocks the data to be transmitted is encoded differently than in the first data block. By combining the information of the data blocks the receiver can decode the coding and find the original data. The data to be transmitted can be encoded e.g. using ½-convolutional coding, and thus the amount of data doubles. Unfortunately, there are several problems related to the use of this protocol in mobile communications systems. Data blocks are not combined until after decoding, and therefore it is not possible to use the encoding and modulation methods suitable for a non-fading channel. Furthermore, when ½-convolutional coding is used, only the first retransmission can improve the possibility of decoding the received packet. If the degree of coding is increased, e.g. by using ¼-convolutional coding, the probability of having to transmit several data blocks before decoding succeeds also increases.

Applications using packet switching require very low bit error rates, for example even a bit error rate of $10^{-9}$ is required of some data transmission services. Examples of such applications are wireless transmission of measurement data intended for medical purposes and wireless transmission of commands intended for controlling some device. Using the traditional ARQ protocol it is very difficult to achieve the above-mentioned bit error rate. The traditional ARQ protocol also wastes the system capacity since it does not take full advantage of erroneous data blocks. Furthermore, the procedure according to the protocol requires a lot of calculation capacity and thus more expensive equipment, since the error correction code has to be always decoded before it is possible to conclude whether to request transmission of the subsequent data block containing the same data.

When data is transmitted on a radio connection that fades occasionally, the signal quality can be improved by adding interleaving to convolutional coding. Interleaving scatters transmission errors, and thus they can be corrected by means of convolutional coding. When retransmission is used for correcting errors, interleaving periods should be short so that it would be possible to adjust to channel changes quickly and to avoid transmitting a lot of data that was received without errors because of a few erroneous sections. On the other hand, interleaving benefits from long interleaving benefits since the influence of channel conditions averages out.

It is problematic to combine retransmissions and interleaving effectively when the unit of data the retransmission of which is requested is shorter than the interleaving period. At the moment retransmission should be requested it is impossible to know whether it would be possible to correct the error later on by means of deinterleaving and decoding the convolutional coding. If errors are found in the received packet after deinterleaving and decoding of the convolutional coding, all transmission units that belong to the interleaving period have to be retransmitted, since after decoding it is no longer known which transmission units were erroneous.

For example, in a proposal relating to the above-mentioned GPRS, interleaving was performed over four subsequent GSM frames and the return channel for a retransmission request was located in each fifth GSM frame. Due to the problem described in the previous paragraph, the duration of interleaving has been reduced in the GPRS of the GSM from 19 transmission units used in circuit switched data transmission in the GSM to 4 transmission units, which weakens the error-averaging influence of interleaving. Even in this case all four transmission units have to be also retransmitted, even though only one transmission unit had contained errors.

In conclusion, different hybrid-ARQ protocols have been developed in order to solve the above-mentioned problems resulting from occasional fading of a radio connection. The solutions described do not, however, utilize the radio resource to be used effectively. Furthermore, they hinder the use of more efficient modulation and coding methods which would allow to improve the utilization of the available radio resources and the quality of the service provided.

BRIEF DESCRIPTION OF THE INVENTION

An object of the present invention is to provide a method for transmitting packet switched data which allows to eliminate the problems described above.

This is achieved with the method for transmitting packet switched data in a mobile communications system between a transmitter-receiver pair using an ARQ protocol, which mobile communications system comprises a network part and at least one subscriber terminal and a bidirectional radio connection between the network part and the subscriber terminal, and the transmitter-receiver pair is formed by the network part and the subscriber terminal, and the data to be transmitted on the bidirectional radio connection is inserted in transmission units. According to the invention, the method is characterized in that the receiver measures the quality of a received transmission unit, and if the quality of the transmission unit is lower than the predetermined quality level required of a transmission unit, the receiver requests at least one retransmission of the transmission unit in question, until the quality measured by the receiver from a combined transmission unit formed by the originally transmitted transmission unit and at least one retransmitted transmission unit exceeds the predetermined quality level required of a combined transmission unit, whereafter the receiver detects the signal which includes the combined transmission unit.

The invention also relates to a mobile communications system for transmitting packet-switched data between a transmitter-receiver pair using an ARQ protocol, which mobile communications system comprises a network part and at least one subscriber terminal and a bidirectional radio connection between the network part and the subscriber terminal, and the transmitter-receiver pair is formed by network part and the subscriber terminal, and the data to be transmitted on the bidirectional radio connection is inserted in transmission units. According to the invention the mobile communications system is characterized in that the network part and/or the subscriber terminal comprise a control part, which is arranged to control packet transmission in such a manner that the originally transmitted transmission unit and retransmitted transmission units are combined before the signal is detected, and retransmissions are requested until the quality of the transmission unit corresponds to the predetermined quality level, whereafter the signal is detected, a quality part in which the quality of a received transmission unit is determined, combining means in which the originally transmitted transmission unit and the retransmitted transmission units are combined.

The method of the invention has several great advantages. In the tests conducted by the applicant the transmission capacity increased considerably compared with the prior art solutions. A bit error rate of $10^{-9}$ is achieved when the C/I ratio is moderate; yet the throughput will be adequate.

By combining transmission units it is possible to eliminate harmful fades nearly completely, even so well that the capacity of the transmission channel is close to that of the theoretical channel of the AWGN type (Average White Gaussian Noise). The bit error rate of the received data improves significantly even before decoding and possible deinterleaving.

Due to the foregoing, multi-level modulation, e.g. 16-QAM (Quadrature Amplitude Modulation), or trellis-coded and block-coded modulation or other techniques which cannot usually be used due to the fading of the transmission channel can be employed in a system applying the invention. Due to the fact that these techniques can be used, the capacity of the system and/or the quality of the transmission service can be improved considerably.

A mobile communications system applying the invention can provide a service of any kind of quality. In that case only the combination of quality and throughput has to be optimized.

When several transmitters use the same time slot, the data to be transmitted still passes through the channel, although the number of retransmissions increases. The transmission capacity of a traditional system would collapse in such a situation. When the load is smaller, the quality in turn improves.

The method can also be used in systems in which the re-use pattern is one, i.e. the same carrier frequencies and time slots are used in adjacent cells.

The arrangement of the invention has the same advantages as the method of the invention. It is clear that preferred embodiments and detailed embodiments can be combined with each other in order to achieve the desired technical effect.

BRIEF DESCRIPTION OF THE DRAWINGS

In the following the invention will be described in greater detail with reference to the examples illustrated in the accompanying drawings, in which FIG. 3 illustrates an example of data transmission using the method of the invention.

DETAILED DESCRIPTION OF THE INVENTION

The present invention can be used in all mobile communications systems in which data is transmitted using packet switching. The term "transmission unit" refers to a transmission unit which is used on a bidirectional radio connection and is the protocol data unit of the first layer (i.e. physical layer) of the seven-layer OSI model of the ISO (Layer 1 Protocol Data Unit). In the TDMA system, for example, the transmission unit may consist of one or more TDMA time slots. In the CDMA system the transmission unit may be a limited period with one or more spreading codes. In the FDMA system the transmission unit may be a limited period with one or more frequencies. In hybrid systems utilizing several multiple-access methods the transmission unit may be any combination of the above examples. Generally speaking, the transmission unit is any resource that can be indicated on the transmission path, i.e. radio connection.

The method of the invention is used for transmitting packet switched data in a mobile communications system between a transmitter-receiver pair using an ARQ protocol. The mobile communications system comprises a network part and at least one subscriber terminal. In this context the network part refers to a fixed element of the network, e.g. a base station, base station controller, mobile services switching centre, or different combinations of these elements. A subscriber terminal may for example be a mobile station, a car phone, or a phone utilizing WLL (Wireless Local Loop). The transmitter-receiver pair is formed by the network part and the subscriber terminal. The network part can function both as the transmitter and as the receiver, and the subscriber terminal may similarly function in either way. There is a bidirectional radio connection between the network part and the subscriber terminal. Transmission units are used for data transmission on the bidirectional radio connection.

Figure 1:
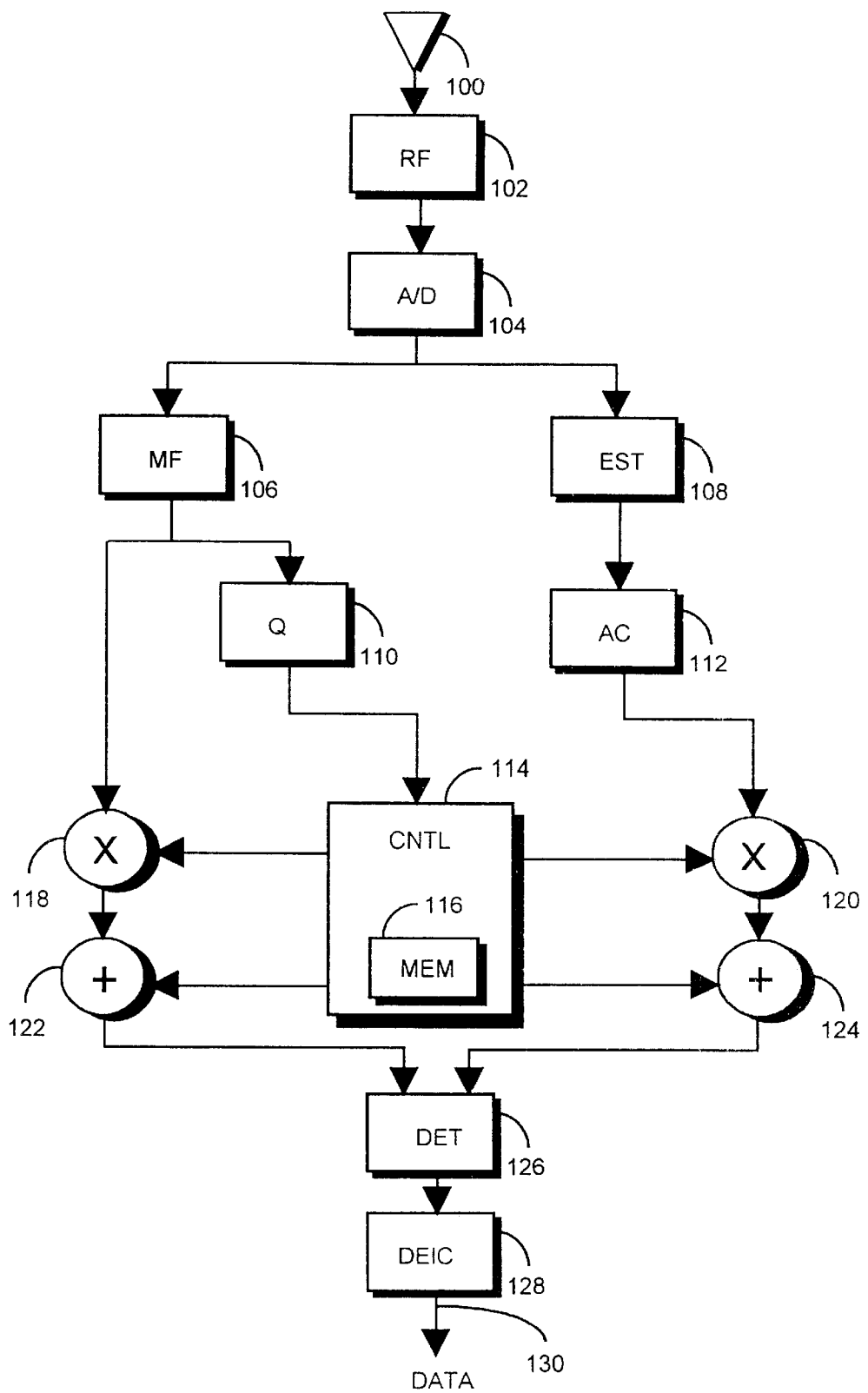
FIG. 1 is a block diagram illustrating an example of a receiver of the invention.

FIG. 1 is a simplified block diagram illustrating a receiver of the invention. FIG. 1 illustrates only the blocks relevant to describing the invention, but it is obvious to one skilled in the art that an ordinary receiver also has several other functions and structures which need not be described more closely in this context. In practice, the receiver may be e.g. a standard receiver of the GSM system which has been modified according to the invention. A signal received by an antenna 100 is supplied to a channel matched filter 106 and channel estimator 108 via radio frequency parts 102 and A/D conversion 104. The results provided by the channel estimator 108 are supplied to the channel matched filter 106 and autocorrelation calculation 112. The operation described up to this point is known from the prior art. This would normally be followed by a signal detection part 126 from which detected symbols are taken into further processing, e.g. when coding and interleaving are used, the symbols are supplied to means 128, in which a packet is decoded and deinterleaved, and the result of this is the originally transmitted data 130. A standard receiver also comprises a control part 114, which controls the operation of different means. For the sake of clarity FIG. 1 does not illustrate other controls than the new controls required by the invention. The control part 114 also comprises a memory 116 in which information can be stored during the processing.

According to the invention, the receiver comprises, in addition to the above-mentioned means, a quality part 110 in which the quality of received transmission units is assessed. Using weighting means 118, 120 in combination a transmission unit can be weighted on the basis of its quality value. Combination means 122 are used for forming a combined transmission unit, and combination means 124 for providing autocorrelation values for the combined transmission unit. The invention also requires modifications to the control part 114. At its simplest the invention is implemented with a software, in which case the control part is a digital signal processing processor or a general processor, and the steps of the method are measures carried out by the software. The invention can also be implemented e.g. with discrete logic composed of HW parts or with the ASIC (Application Specific Integrated Circuit).

The basic idea of the invention is that before the signal is detected, the quality of the transmission unit is checked, and if the quality does not satisfy the set requirements, the transmission unit in question is retransmitted. Thereafter the original transmission unit and the retransmitted transmission unit are combined. If the quality of the combined transmission unit is good enough, the signal can be detected. If the quality is not sufficient, retransmission of the transmission unit in question is requested. This is repeated until the required quality is achieved. The originally transmitted transmission unit and retransmitted transmission units as well as their autocorrelation values are stored in the memory 116 of the control part 114. When the transmission unit achieves the required quality level, the transmission units and the corresponding autocorrelations are combined in the combination means 122, 124 and they are supplied to the detection part 126, where the received symbols are detected. The invention thus concerns integrating quality measurement, diversity combining and the ARQ protocol in the mobile communications environment before detection. The required quality level means quality that is high enough for eliminating occasional channel fading. One transmission may be enough for some transmission units, but on the other hand retransmission may have to be repeated even dozens of times if the conditions deteriorate.

Combination of transmission units can be described mathematically with the equation $$J_n(I_n) = J_{n-1}(I_{n-1}) + \text{Re}\left[I_n^*\left(2\sum_k y_n^{(k)} - I_n\sum_k a_0^{(k)} - 2\sum_{m\leq n-1}\left(I_n\sum_k a_{n-m}^{(k)}\right)\right)\right]$$

where a's represent autocorrelation values of the channel impulse response, y's are the results of the channel matched filter, J's are the metrics in the Viterbi algorithm, I is the information sequence and k is the number of the combined transmission units.

Figure 2:
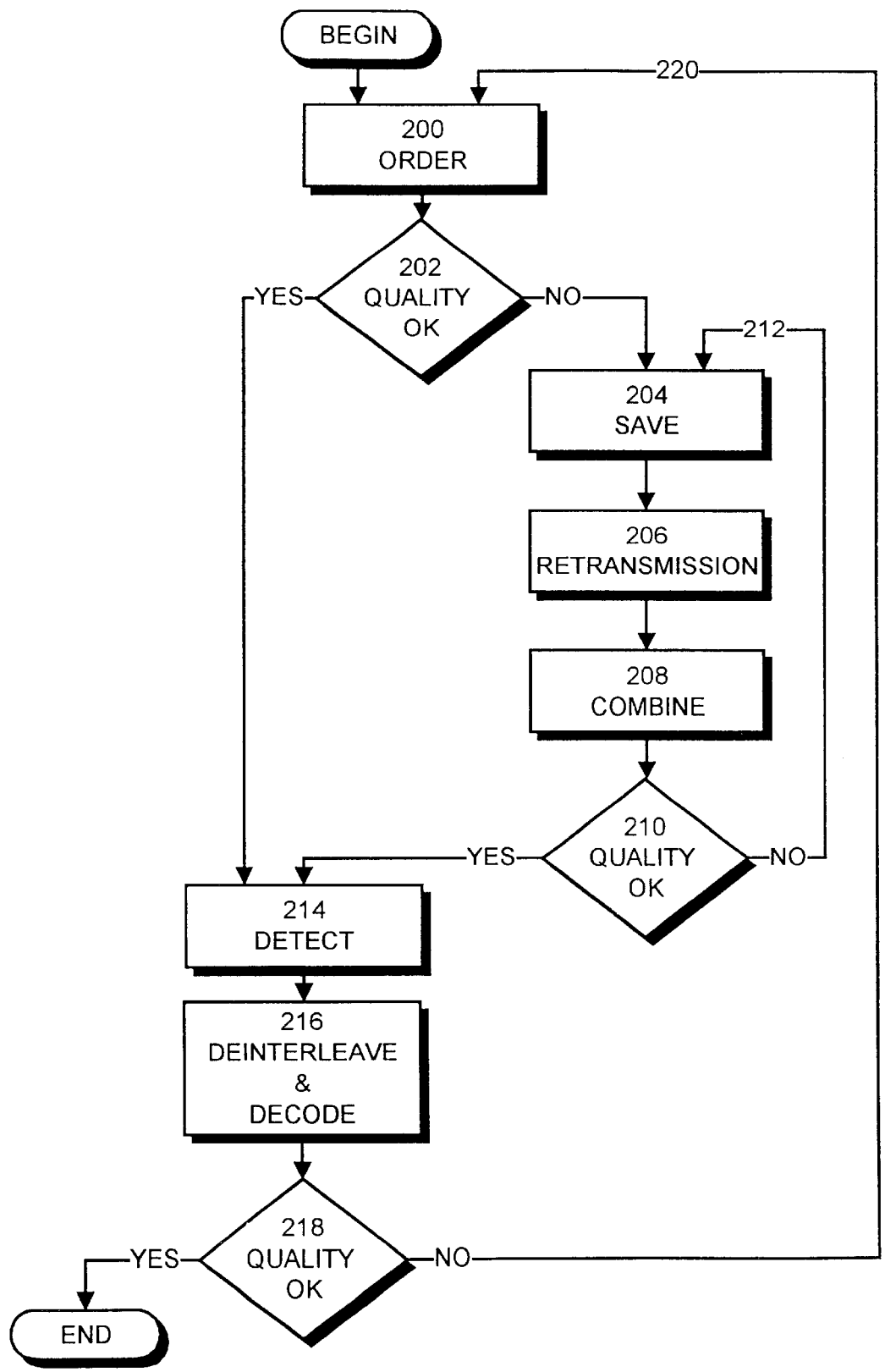
FIG. 2 is a flow chart illustrating an example of execution of the method of the invention.

FIG. 2 is a flow chart illustrating the steps of the method more closely.

Step 200: The receiver can optionally order the desired transmission units, or the transmitter sends first all transmission units automatically at least once.

Step 202: Check the quality of each received transmission unit independently. The receiver has thus already received at least one transmission unit. If the quality of the transmission unit corresponds to the predetermined quality level, the process proceeds to step 214 in which the signal is detected.

Step 204: Store the received transmission unit. The received transmission unit was not of a good enough quality, and thus it is stored for further processing. Alternatively, only the combined transmission unit is stored, and not the separate transmission units forming the combined transmission unit, which allows to save the memory.

Step 206: Send a retransmission request formed on the basis of the quality of the transmission units. Now the transmitter is requested to retransmit the same transmission unit the quality of which did not satisfy the required quality level. Receive the retransmitted transmission unit. This can be carried out immediately after the request or later on.

Step 208: Form a combined transmission unit. A combined transmission unit is formed by combining transmission units received later with the originally received transmission unit.

Step 210: Check the quality of the combined transmission unit. In principle, this is the same check as in step 202. The difference between them is that in step 202 the quality of the originally received transmission unit was checked, whereas in this step the quality of the combined transmission unit is checked. This unit contains both the originally received transmission unit and all retransmissions of the original transmission unit received thereafter. If the quality of the combined transmission unit corresponds to the predetermined quality level, the signal can be detected. If the quality of the combined transmission unit does not correspond to the predetermined quality level, the process will return 212 to step 204, in which the last-received transmission unit is stored, whereafter retransmission is repeated.

Step 214: Detect the signal, i.e. process the transmission unit that is either the originally sent transmission unit or a combined transmission unit. After this step has been performed, the processing of the transmission unit in question can be finished. Then the following transmission unit, for example, can be received and its processing started from step 202.

The method described is in principle an improved version of the classical ARQ protocol, i.e. the same transmission unit is cumulated before detection until the quality of the cumulated transmission unit is good enough. In the method the execution order of the steps is not relevant, but the order of the steps can be changed and new steps can be added. The only thing that is relevant is that transmission units are cumulated before detecting the signal.

Cumulation of a transmission unit is also applied to packet switched data transmission in which the packets to be transmitted are interleaved and encoded. For the sake of clarity it is assumed in the next example that one packet forms one interleaving period. In practice, a packet may consist of several interleaving periods. First, the data to be transmitted is divided into sections of the size of a predetermined packet. The data of each packet is interleaved and encoded e.g. by means of convolutional coding. A CRC checksum (Cyclic Redundancy Check) may also be formed. Each packet is then divided into transmission units individually. One packet is included in at least one transmission unit. The transmitter informs the receiver of the organization of the data to be sent in the manner agreed in advance. The information comprises e.g. the number of the packets, number of the transmission units, numbering of the packets, numbering of the transmission units, and possibly other information. The transmitter receives information from the receiver on the order in which the transmission units should be transmitted. The receiver may at any point request retransmission of a packet or a transmission unit. The functions of the transmitter are thus chiefly controlled by the receiver.

At the receiving end the procedure is the same as described above, except that when the signal has been detected, the packet is deinterleaved and decoded. On the basis of the quality of the packet it is then possible to decide whether to request retransmissions of the transmission units of the packet. FIG. 2 also illustrates this embodiment:

Step 200: First the receiver receives the organization of the data. On the basis of this the receiver knows how the transmitter has organized the data into packets and transmission units and what kind of identification data are used. Some of the data may be prearranged, e.g. in the system's control data which are known both by the transmitter and the receiver. Then the receiver orders transmission units in the desired order. The order is formed using a predetermined order algorithm. The structure of the order algorithm may vary. According to the simplest algorithm the transmission units are ordered in sequential order. According to another kind of algorithm the first transmission units are ordered first from each packet, then the second ones, etc. This has the advantage that occasional fading on the channel does not affect all transmission units of the same packet, but transmission units of different packets. This is in fact a kind of interleaving occurring between the transmission units. The interleaving scatters errors over a longer period, which improves the capacity of the receiver. The order algorithm also defines the order strategy, i.e. whether to order all transmission units at once, or whether to order only a certain number of transmission units, after the reception of which it is decided whether to order new transmission units or retransmissions of the transmission units already received. One possible order algorithm is such an algorithm that learns how many times each transmission unit has to be retransmitted on average until the packet formed of transmission units can be decoded correctly. In that case, according to the algorithm, it is requested at the beginning that all packets should be transmitted more than once, e.g. three times, without a separate request. In poor conditions this may be the fastest way of transmitting the packets since time is not wasted on retransmission requests of packets and unsuccessful attempts of decoding a packet.

Steps 202, 204, 206, 208 and 210 are performed as was described above.

Before it is possible to proceed to detection 214, transmission units of at least one packet should be already received so that the packet could be decoded. If convolutional coding is used according to the type II hybrid-ARQ protocol, even part of the transmission units may be enough for decoding the packet. Use of coding is optional since the method can partially, and in certain conditions completely, replace error correction coding, FEC (Forward Error Correction). The applicant's tests showed that especially if the subscriber terminal moves slowly or if, when interleaving is used, the interleaving period is short, the method of the invention guarantees a better transmission result than the use of convolutional coding. If the transmission channel is to be of especially good quality, the method of the invention as well as coding and possibly interleaving are used.

Step 216: Deinterleave and decode the packet. The quality of the transmission units of the packet was so good that it is worthwhile deinterleaving and decoding the packet.

Step 218: Check whether the packet is faulty. Now it is checked whether there were errors in the packet e.g. by checking the CRC checksum. If there were errors in the packet, return 220 to step 200 in which retransmission of the transmission units of the poorest quality, for example, is ordered according to the order algorithm. If there were no errors in the packet, the originally transmitted data can be processed, e.g. they can be supplied to the application that ordered the packet. Then it is possible to check whether all data have been processed. The subscriber knows how many packets or transmission units the transmitter was to transmit. If all the data have been processed, the function can be discontinued. If this is not the case, return to step 200, in which according to the order algorithm more packets or the missing packets are ordered, for example.

Figure 3A:
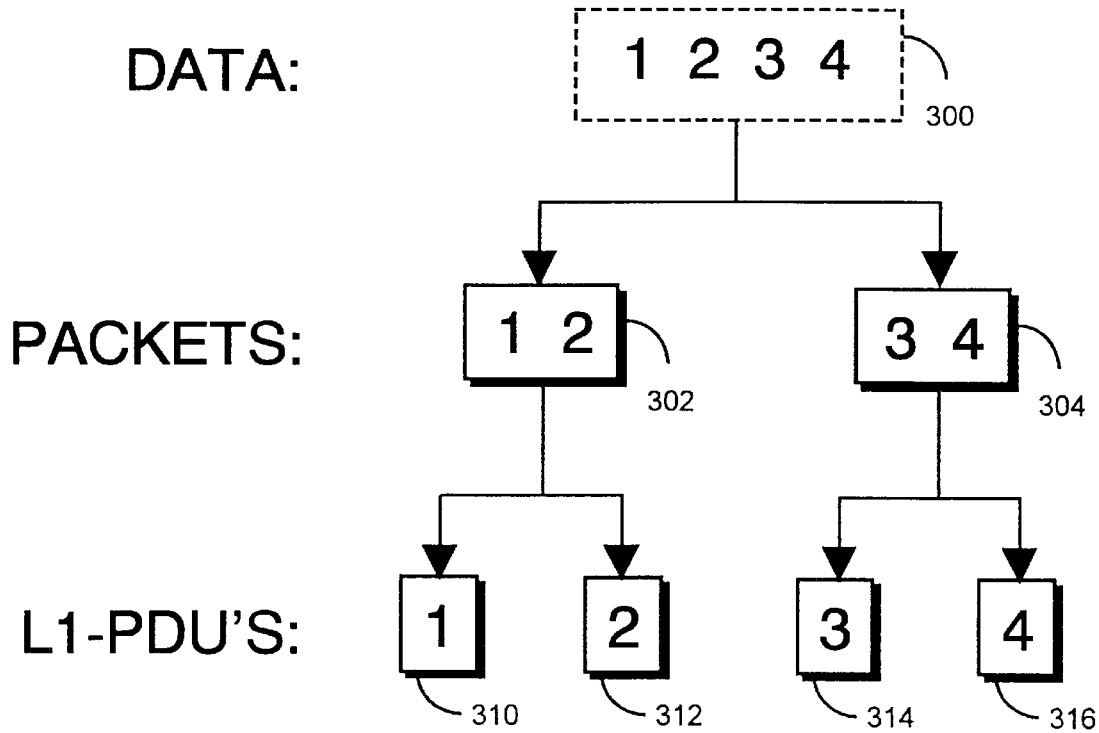
FIG. 3A illustrates data processing during transmission.

FIG. 3 illustrates an example of how packets are transmitted according to the method. In FIG. 3A the transmitter divides the data 300 to be transmitted into packets. The first packet 302 contains data 1 2 and the second packet 304 data 3 4. Both packets are further divided into transmission units. The first packet 302 is divided into two transmission units. The first transmission unit 310 contains data 1 and the second transmission unit 312 data 2. The second packet 304 is divided into two transmission units correspondingly. The first transmission unit 314 contains data 3 and the second transmission unit 316 data 4. For the sake of simplicity the data describing the data to be transmitted in this example are as simple as possible, but in reality the data are, of course, much more complex. Neither the information structures required by the packets and transmission unit have been described for the sake of simplicity, nor the possible use of interleaving and coding.

Figure 3B:
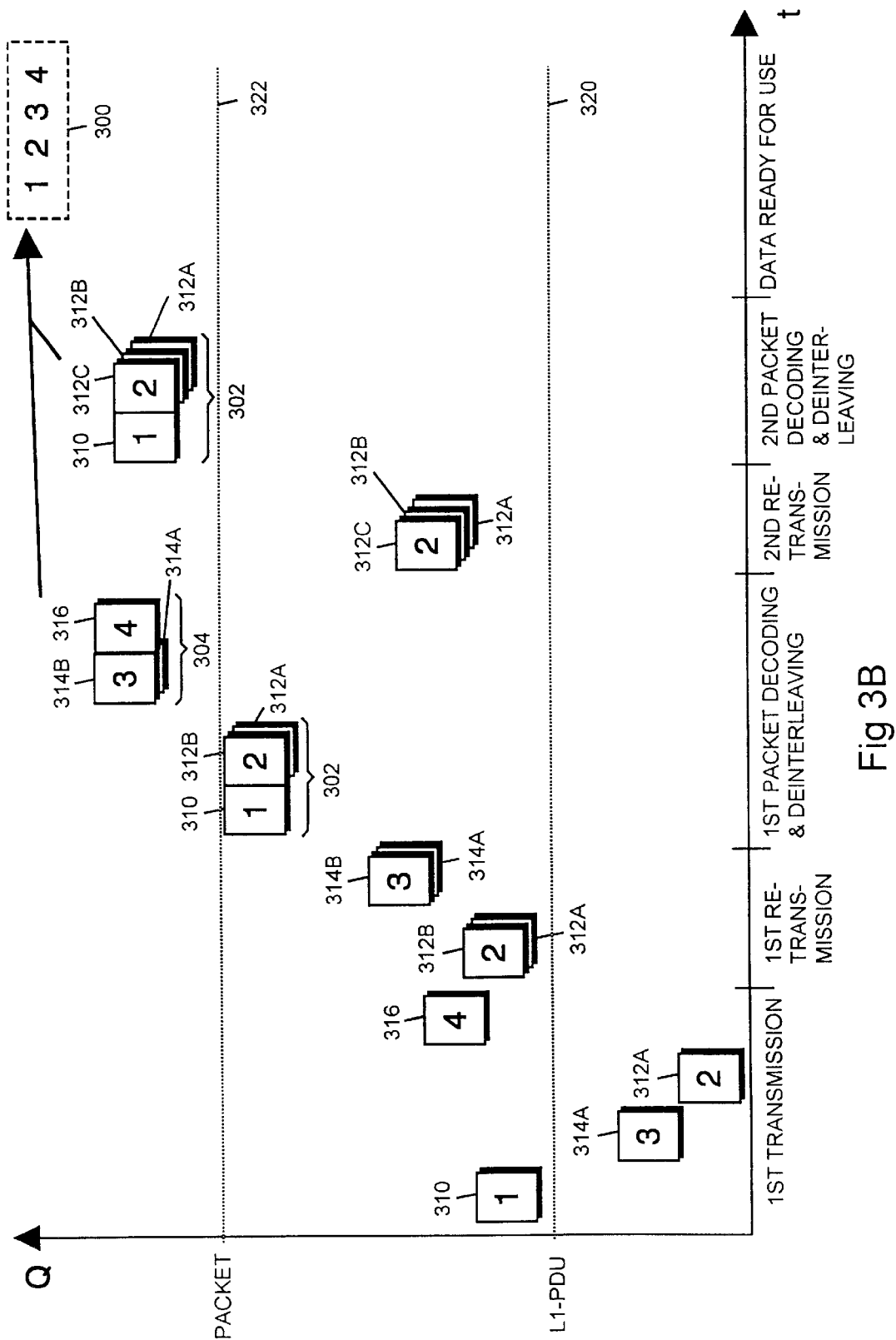
FIG. 3B illustrates data processing at the receiving end.

In FIG. 3B the X-axis indicates time and the Y-axis quality. Quality refers to the measured quality of a transmission unit and the measured quality of a packet. The quality of a transmission unit and the quality of a packet are not proportional to each other; they have been placed on the same Y-axis only to facilitate illustration. The quality of a transmission unit is typically determined by measuring the signal-to-noise ratio of the transmission unit, and the quality of a packet is determined by checking the CRC of the packet.

First the receiver receives all transmission units 310, 312A, 314A, 316 once. Two transmission units 310, 316 satisfy the quality level 320 required of a transmission unit. Two transmission units 312A, 314A do not satisfy the required quality level 320 due to a sudden fading on the radio path, and thus retransmission 312B, 314B will be carried out. Now the quality of the transmission units 312B and 312A, 314B and 314A combined according to the invention exceeds the required quality level 320. Thus the packets can be deinterleaved and decoded. The quality of the packet 304 formed of the transmission units 314B, 314A and 316 exceeds the quality level 322 required of a packet, and thus it is ready for processing. The quality of the packet 302 formed of the transmission units 310, 312B and 312A is lower than the quality level 322 required of a packet, and thus the worse transmission unit 312 of the packet is retransmitted 312C. Now the quality of the combined transmission unit 312C, 3142, 312A clearly exceeds the quality level 320 required of a transmission unit, and thus it is noticed when the packet 302 formed of the transmission units 310, 312C, 312B and 312A is deinterleaved and decoded that its quality exceeds the quality level 322 required of a packet. Thus the data 300 transmitted originally by the transmitter can now be decoded at the receiving end.

In one preferred embodiment, at least two transmitter-receiver pairs use the same time slot for sending a transmission unit in a mobile communications system utilizing the TDMA. These transmitter-receiver pairs can be located in adjacent cells when the re-use pattern of the system is one, or the transmitter-receiver pairs may be even within the same cell. The transmission units of each transmitter-receiver pair have a training sequence of their own, on the basis of which the transmitter-receiver pair separates its own transmission units. The idea is that the training sequence is a code by means of which the receiver separates transmissions intended for it from a channel.

There are several methods for checking the quality of the transmission unit and the packet. It is possible to form a CRC error checksum separately both for the transmission unit and the packet in the transmission. This sum is used for checking at the receiving end whether the transmission unit and/or the packet contains errors. It is also possible to use other ways of forming the error checksum. Quality can also be determined by forming a bit error rate of the transmission unit. The quality of a received transmission unit can also be determined by forming the C/I ratio (Carrier/Interference) of the transmission unit by means of the training sequence. This is carried out e.g. by correlating a known training sequence on the basis of the impulse response of the channel estimated in the channel estimator 108. The difference between this correlation and the training sequence included in the actual received transmission unit determines the noise and interference of the received signal. This can be expressed by the following equation $$y=x*h+I+N$$

where * represents a mathematical convolution operator, y is the received signal, x is the transmitted signal, h is the channel impulse response, I is interference and N is noise. This allows the signal-to-noise ratio, i.e. the C/I ratio, to be calculated; C is the energy of the received training sequence. In the above we have given some examples of how the quality of a transmission unit or a packet can be determined. It is, however, possible to use any other prior art method for measuring the quality.

In one preferred embodiment the quality level of a combined transmission unit is determined by comparing the average quality level of the transmission units with the adaptive quality threshold. The average quality level is obtained e.g. by calculating the average or by defining a numerical limit to how many transmission units of a packet have to satisfy the required quality level. Adaptivity means that the system can be self-learning, whereby the system optimizes its function by modifying the quality limits so that they correspond to the conditions and in order to maximise efficient use of the transmission capacity.

In one preferred embodiment a part of the transmission unit is requested to be retransmitted. This allows to save transmission capacity. Let us assume, for example, that the transmission unit is one TDMA time slot. Such a TDMA time slot is included in the radio burst to be to be transmitted to a radio path. If the fade affects only for example the first part of the burst, this is noticed at the receiving end and only retransmission of the first part of the burst is requested, and instead of the whole burst, only half a burst is needed as the transmission unit.

The method of the invention requires a bidirectional transmission path since data is transmitted in one direction and control information, e.g. retransmission requests, in the other. The basic requirement is that the transmitter and the receiver are able to indicate each transmission unit unequivocally by means of an identifier at their own ends (L1-PDU-ID=Layer 1 Protocol Data Unit Identification). The transmitter should be able to decode the identification data used for the transmission unit by the receiver so that when the receiver gives any identification data, the transmitter knows which identification data of the transmission unit it corresponds to.

In the following we shall give an example of how a protocol is processed when information is transmitted using the uplink transmission path, i.e. from the subscriber terminal to the network part. The transmitter, i.e. the subscriber terminal, requests capacity for transmitting a certain amount of data. The amount is expressed by a number which can be directly interpreted as the number of transmission units that are needed. Having received the request the network part allocates an identifier (RID=Reservation Identification) to the subscriber terminal for transmission of the data.

The subscriber terminal simultaneously listens to the channel (CCH=Control Channel) on which the allocations of resources are announced. On the CCH the network part announces which RID is allowed to transmit on which traffic channel (TCH). The subscriber terminal also listens to an order channel (FO=Forward Order), on which the network part announces which transmission units and on which TCH a subscriber terminal having a certain RID should transmit. In other words, the subscriber terminal monitors the occurrence of its own RID on the CCH, and having noticed its own RID it finds out from the FO which transmission units it should transmit on the TCH. It is of course possible to allocate several TCHs, in which case the subscriber terminal sends its transmission units to the network part on all of them.

The subscriber terminal concludes from the L1-PDU-IDs requested on the FO which transmission units will no longer be requested to be retransmitted, i.e. their quality has been good enough when the network part has received them or a good enough quality has been achieved by combining transmission units. Thus the subscriber terminal can control its reception buffer, i.e. remove unnecessary transmission units from its buffer. The network part correspondingly knows which transmission units it no longer needs, and thus it can control its own transmission buffer. Transmission continues as was described above until the total amount of data has been transferred.

The following example correspondingly describes how a protocol is processed when data is transmitted in the downlink direction, i.e. from the network part to the subscriber terminal. The transmitter, i.e. the network part, informs the receiver of the identifier (RID) which it will use for transmitting a certain amount of data. The amount of data can also be communicated.

The subscriber terminal starts to listen to the CCH, on which the network part announces to which RID transmission units are transmitted on each TCH. The network part may also transmit on the FO, on which it announces which transmission units will be transmitted on which TCH. The subscriber terminal also listens to the order allocation channel (FOS=Forward Order Scheduler), on which the network part announces on which FO a subscriber terminal related to a certain RID is allowed to transmit an order. It is not compulsory to use the FOS, in which case the subscriber terminal knows on which FO and when it should transmit an order.

On the FO the subscriber terminal communicates the L1-PDU-IDs the network part should transmit on the TCHs it has allocated. The network part also concludes from the information given on the FO or another channel which transmission units will no longer be ordered, and thus it can remove these units from its transmission buffer. The subscriber terminal knows which transmission units it will no longer order, and thus it can control its reception buffer.

Figure 3C:
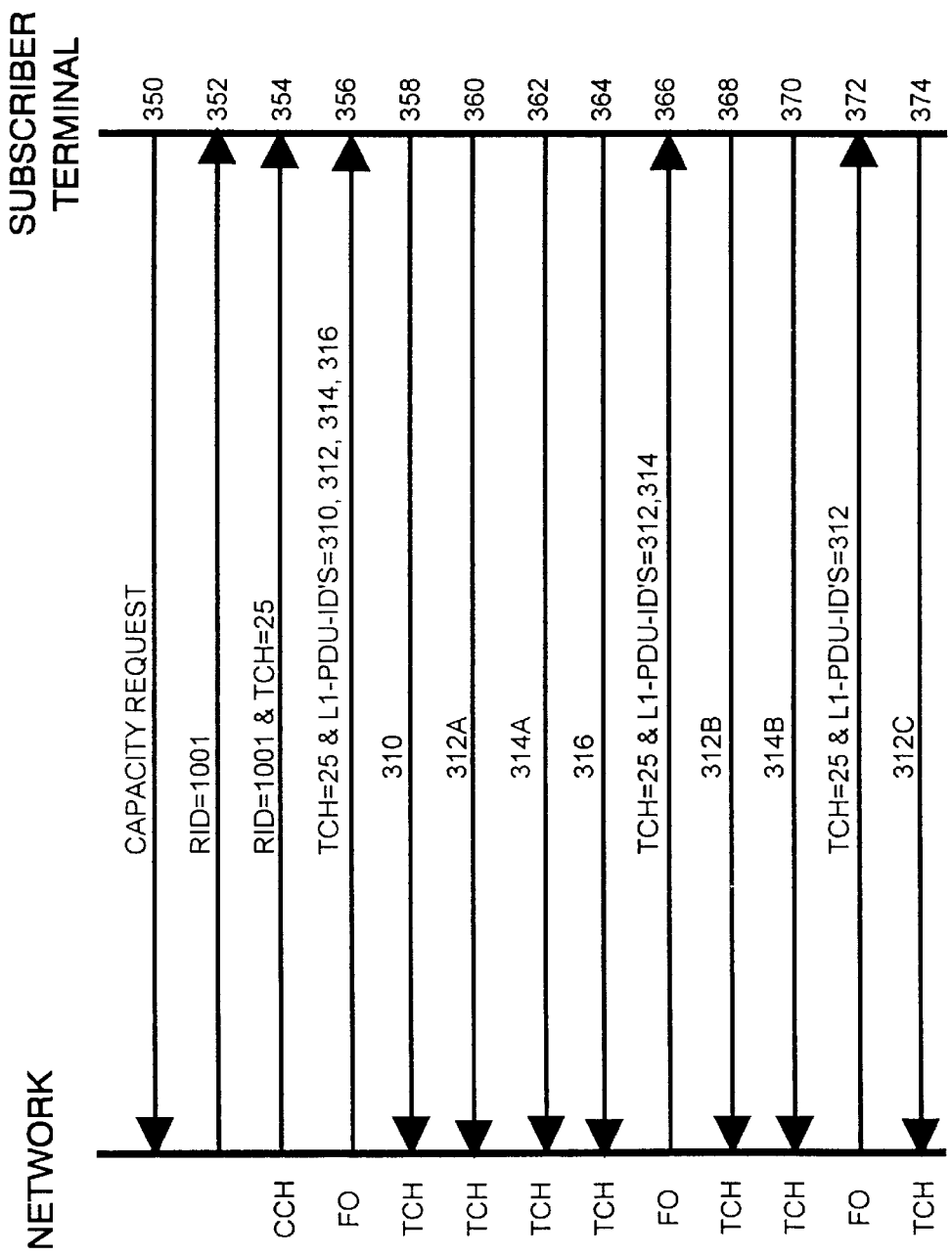
FIG. 3C illustrates signalling related to the transmission.

As regards protocol processing, the data transmission described in FIG. 3B is performed e.g. in the manner described in FIG. 3C. It is assumed that the transmitter is the subscriber terminal and the receiver is the network part. Thus the case of the uplink transmission path also applies to this case. The subscriber terminal requests 350 capacity for transmitting the transmission units 310, 312, 314, 316. Having received the request the network part allocates 352 a RID having a value of 1001 to the subscriber terminal. The network part communicates 354 on the CCH that a RID having a value of 1001 may transmit on a TCH having a value of 25. The subscriber terminal also listens to the FO on which the network part communicates 356 that the subscriber terminal should transmit the transmission units the L1-PDU-IDs of which are 310, 312, 314, 316 on the TCH having a value of 25. Next the subscriber terminal sends 358, 360, 362, 364 the requested transmission units 310, 312, 314 and 316 on the TCH having a value of 25. Then the network part communicates 366 on the FO that it requires retransmissions of transmission units 312 and 314 on the TCH having a value of 25. The subscriber terminal transmits 368, 370 the requested transmission units. Finally the network part requests 372 again retransmission of transmission unit 312 on the FO, and the subscriber terminal performs 374 this. Thus the transmission has been completed and the reserved transmission capacity can be released.

The options to be described next concern both transmission directions. The transmitter may ask for extra capacity for transmitting a new amount of data after the previous transmission has ended, whereby a new RID is obtained for the order. The transmitter may also ask for extra capacity before the previous transmission has finished, whereby a new RID can be allocated for transmission, or it can be agreed that the requested amount of data is transmitted by means of the RID already allocated. Orders as well as channel allocation signalling may be CRC-protected on the FO. Thus it is not necessary to include the L1-PDU-IDs of an order in the actual transmission units. If the CRC check is not passed at the receiving end of the order, the ordered transmission units are not transmitted. The receiver notes this and repeats the order. Poor quality of the order can be also detected by means of another method. Ordering of transmission units may be a process separate from the allocation of the traffic channel used for transmission on the bidirectional radio connection. The network part may be responsible for all channel allocations both when it functions as a transmitter and when it functions as a receiver. On the basis of predetermined information and/or information received from the receiver the transmitter knows which order channel the transmitter should listen to and what timing would be suitable for listening.

In the described embodiment it is essential for both transmission directions that the transmitter informs the receiver of the organization of data and the receiver orders the desired transmission unit or packets. In an order it is possible to indicate selectively transmission units of several packets. In other words, the receiver can order the transmission units in random order. Usually, however, ordering is controlled by an algorithm which makes transmission more effective. The function of the transmitter may be controlled so that it transmits only the ordered transmission units. Optionally, the transmitter may transmit transmission units according to orders and a predetermined algorithm.

In addition to the foregoing, implementation of the protocol of the invention comprises several optional improvements which will be described in the following.

The receiver may request retransmission of only those transmission units that do not satisfy the required quality level. In that case the transmission units of a combined transmission unit that are of the poorest quality are retransmitted first. If the packet still cannot be correctly decoded after this, retransmissions of other transmission units are also requested.

A retransmission request or an order of a transmission unit may comprise the quality value of the transmission unit. The quality value is a way of indicating the quality of a transmission unit, being agreed in advance by the transmitter and the receiver, e.g. the quality values may be numerical values from 0 to n. The equivalencies could be e.g. the following: 0=not transmitted, 1=very poor quality, 2=rather poor quality, . . . , n=a very good quality. This has the advantage that the transmitter may send the transmission units in the order according to the quality value. Thus the transmission units that have not been transmitted yet are transmitted first, then the transmission units that have a very poor quality value. The receiver does not need to give a definite order in which it wishes to receive the transmission units. Since the poorest transmission units are retransmitted first, the probability of the receiver being able to decode a packet correctly increases. Ordering of a packet or a retransmission request may correspondingly also comprise the quality value of the packet.

The receiver may notify the transmitter after it has succeeded in processing a transmission unit or a packet. This means that the receiver may at any time try to decode possible coding and interleaving and to check the error correction sum. If decoding succeeds without errors, the transmitter may conclude from this kind of a message that it no longer needs to retransmit the transmission units belonging to the packet in question, although there were a valid request for retransmitting them. This function is thus a kind of cancellation message.

The receiver may count how many times it has requested retransmission of each transmission unit. This is done because a limit may be defined for the number of retransmission requests in the order algorithm. If it is not possible to transmit data correctly within this limit, transmission of the data in question, i.e. a transmission unit or a packet, is restarted and the receiver deletes the retransmitted transmission units it may have previously stored from its memory.

Although the invention has been described by means of an example illustrated in the accompanying drawings, it is evident that the invention is not limited to it, but it may be modified in several ways within the scope of the inventive concept disclosed in the appended claims.

What is claimed is:

1. A method for transmitting packet switched data in a mobile communications system between a transmitter-receiver pair using an ARQ protocol, which mobile communications system comprises a network part and at least one subscriber terminal and a bidirectional radio connection between the network part and the subscriber terminal, and the transmitter-receiver pair is formed by the network part and the subscriber terminal, the method comprising:

the transmitter inserts the packet switched data to be transmitted on the bidirectional radio connection in transmission units;

the transmitter transmits the transmission units to the receiver;

the receiver checks the quality of each received transmission unit independently;

the receiver stores the received transmission units;

the receiver transmits a retransmission request formed on the basis of the quality of the transmission units to the transmitter;

the transmitter retransmits the requested transmission units to the receiver;

the receiver forms combined transmission units from the originally transmitted transmission unit and from the corresponding at least one retransmitted transmission unit;

the receiver checks the quality of each combined transmission unit;

the receiver stores the combined transmission units;

repeating the retransmission-requesting and retransmission until the quality of the combined transmission units corresponds to the predetermined quality level required of the combined transmission unit;

the receiver detects the signal which includes the combined transmission unit; and wherein a packet is encoded and interleaved in transmission, and after the signal has been detected, the receiver deinterleaves and decodes the packet, and decides on the basis of the quality of the packet whether to request retransmissions of the transmission units of the packet.

2. A method according to claim 1, wherein the method also comprises the steps of:

repeating the preceding steps until the quality of the packet corresponds to a predetermined quality level.

3. A method according to claim 1, wherein the receiver deinterleaves and decodes the packet before all transmission units are sent if the quality of the transmission units already received corresponds to the predetermined quality level.

4. A method according to claim 1, wherein the method comprises no coding protecting against errors in transmission units.

5. A method according to claim 1, wherein retransmission of a part of the transmission unit is requested.

6. A method according to claim 1, wherein in connection with combination the transmission unit is weighted on the basis of its quality value.

7. A method according to claim 1, wherein in a mobile communications system utilizing the TDMA at least two transmitter-receiver pairs employ the same time slot for sending a transmission unit, and the transmission units of each transmitter-receiver pair have a training sequence of their own on the basis of which the transmitter-receiver pair distinguishes its own transmission units.

8. A method according to claim 1, wherein a CRC error checksum is formed for each transmission unit and/or packet in transmission, and this sum is used for checking at the receiving end whether the transmission unit and/or packet contains errors.

9. A method according to claim 1, wherein the quality of a received transmission unit is determined by forming the C/I ratio of the transmission unit by means of a training sequence contained in the transmission unit.

10. A method according to claim 1, wherein the quality of the received transmission unit is determined by forming the bit error rate of the training sequence of the transmission unit.

11. A method according to claim 1, wherein the quality level of the combined transmission unit is determined by comparing the average quality level of the transmission units with an adaptive quality threshold.

12. A method according to claim 1, wherein the transmission units of the combined transmission unit that is of the poorest quality is retransmitted first.

13. A method according to claim 1, wherein the retransmission request of a transmission unit comprises the quality value of the requested transmission unit.

14. A method according to claim 1, wherein retransmission occurs in the order according to the quality of the transmission unit measured at the receiving end, wherein the transmission unit of the poorest quality is retransmitted first.

15. A method according to claim 1, wherein the receiver notifies the transmitter after it has succeeded in processing a transmission unit and/or a packet.

16. A method according to claim 1, wherein the receiver counts how many times it has requested retransmission of each transmission unit.

17. A method according to claim 2, wherein the receiver counts how many times it has requested retransmission of each packet.

18. A mobile communications system for transmitting packet-switched data between a transmitter-receiver pair using an ARQ protocol, which mobile communications system comprises a network part and at least one subscriber terminal and a bidirectional radio connection between the network part and the subscriber terminal, and the transmitter-receiver pair is formed by the network part and the subscriber terminal, and the data to be transmitted on the bidirectional radio connection is inserted in transmission units, the network part and/or subscriber terminal comprising:

- a control part, which is arranged to control packet transmission in such a manner that the originally transmitted transmission unit and retransmitted transmission units are combined before the signal is detected, and retransmissions are requested until the quality of the combined transmission unit corresponds to a predetermined quality level, whereafter the signal is detected,
- a quality part in which the quality of a received transmission unit is determined,
- combining means in which the originally transmitted transmission unit and the retransmitted transmission units are combined;
- wherein the network part and/or the subscriber terminal comprising means for checking the quality of each received transmission unit independently;
- storing the received transmission units;
- sending a retransmission request formed on the basis of the quality of the transmission units;
- forming combined transmission units; checking the quality of each combined transmission unit;
- not letting the combined transmission unit into the detection part until the quality of the combined transmission unit corresponds to the predetermined quality level; and
- wherein the control part is also arranged to decide on the basis of the quality of a deinterleaved and decoded packet whether retransmissions of the transmission units of the packet should be requested.

19. A system according to claim 18, wherein the network part and/or the subscriber terminal comprises weighting means, and the control part is arranged to weight a transmission unit on the basis of its quality value in connection with combination using the weighting means.

* * * * *

UNITED STATES PATENT AND TRADEMARK OFFICE
CERTIFICATE OF CORRECTION

PATENT NO. : 6,317,418 B1
DATED : November 13, 2001
INVENTOR(S) : Raitola et al.

It is certified that error appears in the above-identified patent and that said Letters Patent is hereby corrected as shown below:

<u>Column 14,</u>
Line 63, delete "claim 2" and insert -- claim 1 --.

Signed and Sealed this

Thirteenth Day of August, 2002

Attest:

JAMES E. ROGAN
Attesting Officer   Director of the United States Patent and Trademark Office